US 8,724,698 B2

(12) United States Patent
Lin

(10) Patent No.: US 8,724,698 B2
(45) Date of Patent: May 13, 2014

(54) METHOD AND SYSTEM FOR VIDEO RATE CONTROL

(75) Inventor: Ken Kengkuan Lin, Redwood, CA (US)

(73) Assignee: Apple Inc., Cupertino, CA (US)

( * ) Notice: Subject to any disclaimer, the term of this patent is extended or adjusted under 35 U.S.C. 154(b) by 1869 days.

(21) Appl. No.: 11/734,968

(22) Filed: Apr. 13, 2007

(65) Prior Publication Data

US 2008/0253450 A1   Oct. 16, 2008

Related U.S. Application Data

(63) Continuation-in-part of application No. 11/734,935, filed on Apr. 13, 2007.

(51) Int. Cl.
*H04N 7/12* (2006.01)

(52) U.S. Cl.
USPC .................................................. 375/240.03

(58) Field of Classification Search
USPC ............... 375/137, 145, 240.03, 240.22, 245, 375/286–287; 382/196, 232, 194, 248, 251, 382/253, 270–273; 358/1.2, 3.12, 358/3.21–3.24, 3.28, 539, 426.06, 426.14, 358/465; 704/230
See application file for complete search history.

(56) References Cited

U.S. PATENT DOCUMENTS

| | | | | |
|---|---|---|---|---|
| 5,426,463 A * | 6/1995 | Reininger et al. | ....... | 375/240.03 |
| 5,544,284 A * | 8/1996 | Allebach et al. | ............... | 345/603 |
| 5,666,461 A * | 9/1997 | Igarashi et al. | ................ | 386/329 |
| 5,949,490 A * | 9/1999 | Borgwardt et al. | ...... | 375/240.05 |
| 6,862,402 B2 * | 3/2005 | Kim | .............................. | 386/330 |
| 6,963,608 B1 * | 11/2005 | Wu | .......................... | 375/240.03 |
| 7,292,691 B2 * | 11/2007 | Candelore et al. | ............ | 380/212 |
| 7,856,149 B2 * | 12/2010 | Govindaswamy et al. | ... | 382/239 |
| 7,885,337 B2 * | 2/2011 | Lee et al. | ................. | 375/240.25 |
| 2003/0206590 A1 | 11/2003 | Krishnamachari | | |

OTHER PUBLICATIONS

Yu et al., "A novel two-pass VBR coding algorithm for fixed-size storage application," IEEE Trans. on Circuits and Systems for Video Technology, 11(3): 345-356 (Mar. 2001).

Song et al., "Rate control for low-bit rate video via variable-encoding frame rates," IEEE Trans. on Circuits and Systems for Video Technology, 11(4): 512-521 (Apr. 2001).

Xin et al., "An HDTV-to-SDTV spatial transcoder," IEEE Trans. on Circuits and Systems for Video Technology, 12 (11): 998-1008 (Nov. 2002).

Wang et al., "Bit allocation and constraints for joint coding of multiple video programs," IEEE Trans. on Circuits and Systems for Video Technology, 9(6): 949-959 (Sep. 1999).

(Continued)

*Primary Examiner* — Kambiz Zand
*Assistant Examiner* — Leynna Truvan
(74) *Attorney, Agent, or Firm* — Kenyon & Kenyon LLP

(57) ABSTRACT

A method and system are provided for encoding a picture. The method includes encoding the picture into a first encoded picture using a first universal quantizer. If a size of the first encoded picture is greater than a maximum picture size, the method includes encoding the picture into a second encoded picture using small quantizers for smooth regions of the picture and large quantizers for complex regions. If a size of the second encoded picture is still greater than a maximum picture size, the method includes encoding the picture into a third encoded picture with revised quantizers for complex regions and dropping high frequency coefficients if necessary to ensure the encoded picture size never exceeds the maximum size.

16 Claims, 4 Drawing Sheets

(56) References Cited

OTHER PUBLICATIONS

Zhihai He, Y.K. Kim, and S.K. Mitra, "Low-delay rate control for DCT video coding via ρ-domain source modeling," IEEE Trans. on Circuits and Systems for Video Technology, Aug. 2001, vol. 11, No. 8.

Zhihai He and S.K. Mitra, "Optimum bit allocation and accurate rate control for video coding via ρ-domain source modeling," IEEE Trans. on Circuits and Systems for Video Technology, Oct. 2002, pp. 840-849, vol. 12, No. 10.

Zhihai He and S.K. Mitra, "A unified rate-distortion analysis framework for transform coding," IEEE Trans. on Circuits and Systems for Video Technology, Dec. 2001, pp. 1221-1236, vol. 11, No. 12.

Wei Ding, "Joint encoder and channel rate control of VBR video over ATM networks," IEEE Trans. on Circuits and Systems for Video Technology, Apr. 1996, pp. 266-278, vol. 7, No. 2.

Wei Ding and B. Liu, "Rate control of MPEG video coding and recoding by Rate-Quantization modeling," IEEE Trans. on Circuits and Systems for Video Technology, Feb. 1996, pp. 12-20, vol. 6, No. 1.

I-Ming Pao and Ming-Ting Sun, "Encoding stored video for streaming applications," IEEE Trans. on Circuits and Systems for Video Technology, Feb. 2001, pp. 199-209, vol. 11, No. 2.

Jordi Ribas-Corbera and S.-M. Lei, "A frame-layer bit allocation for H.263+," IEEE Trans. on Circuits and Systems for Video Technology, Oct. 2000, pp. 1154-1158, vol. 10, No. 7.

Yan Yang and S.S. Hemami, "Rate control for VBR video over ATM: Simplification and implementation," IEEE Trans. on Circuits and Systems for Video Technology, Nov. 2001, pp. 1045-1058, vol. 11, No. 9.

Supavadee Aramvith, I.-M. Pao, and M.-T. Sun, "A rate-control for video transport over wireless channels," IEEE Trans. on Circuits and Systems for Video Technology, May 2001, pp. 569-580, vol. 11, No. 5.

I-Ming Pao and M.-T. Sun, "Encoding stored video for streaming applications," IEEE Trans. on Circuits and Systems for Video Technology, Feb. 2001, pp. 199-209, vol. 11, No. 2.

Lilla Boroczky, A.Y. Ngai, and E.F. Westerman, "Joint rate-control with look-ahead for multi-program video coding," IEEE Trans. on Circuits and Systems for Video Technology, Oct. 2000, pp. 1159-1163, vol. 10, No. 7.

Jordin Ribas-Corbera and S. Lei, "Rate control in DCT video coding for low-delay communications," IEEE Trans. on Circuits and Systems for Video Technology, Feb. 1999, pp. 172-185, vol. 9, No. 1.

Po-Yuen Cheng, J. Li, and C.-C.J. Kuo, "Rate control for and embedded wavelet video coder," IEEE Trans. on Circuits and Systems for Video Technology, Aug. 1997, pp. 696-702, vol. 7, No. 4.

Kuo-Chin Fan and K.-S. Kan, "An active scene analysis-based approach for pseudoconstant bit-rate video coding," IEEE Trans. on Circuits and Systems for Video Technology, Apr. 1998, pp. 159-170, vol. 8, No. 2.

Ashish Jagmohan and K. Ratakonda, "MPEG-4 one-pass VBR rate control for digital storage," IEEE Trans. on Circuits and Systems for Video Technology, May 2003, pp. 447-452, vol. 13, No. 5.

Anthony Vetro, H. Sun, and Y. Wang, "MPEC-4 rate control for multiple object coding," IEEE Trans. on Circuits and Systems for Video Technology, Feb. 1999, pp. 186-199, vol. 9, No. 1.

Jose I. Ronda, F. Jaureguizar, and N. Garcia, "Rate control and bit allocation for MPEG-4," IEEE Trans. on Circuits and Systems for Video Technology, Dec. 1999, pp. 1243-1258, vol. 9, No. 8.

Hung-Ju Lee, T. Chiang, and Y.-Q. Zhang, "Scalable rate control for MPEG-4 video," IEEE Trans. on Circuits and Systems for Video Technology, Sep. 2000, pp. 878-894, vol. 10, No. 6.

Feng Pan, Z. Li, K. Lim, and G. Feng, "A study of MPEG-4 rate control scheme and its improvements," IEEE Trans. on Circuits and Systems for Video Technology, May 2003, pp. 440-446, vol. 13, No. 5.

Jeong-Woo Lee, A. Vetro, Y. Wang, and Y.-S. Ho, "Bit allocation for MPEG-4 video coding with spatio-temporal tradeoffs," IEEE Trans. on Circuits and Systems for Video Technology, Jun. 2003, pp. 488-502, vol. 13, No. 6.

\* cited by examiner

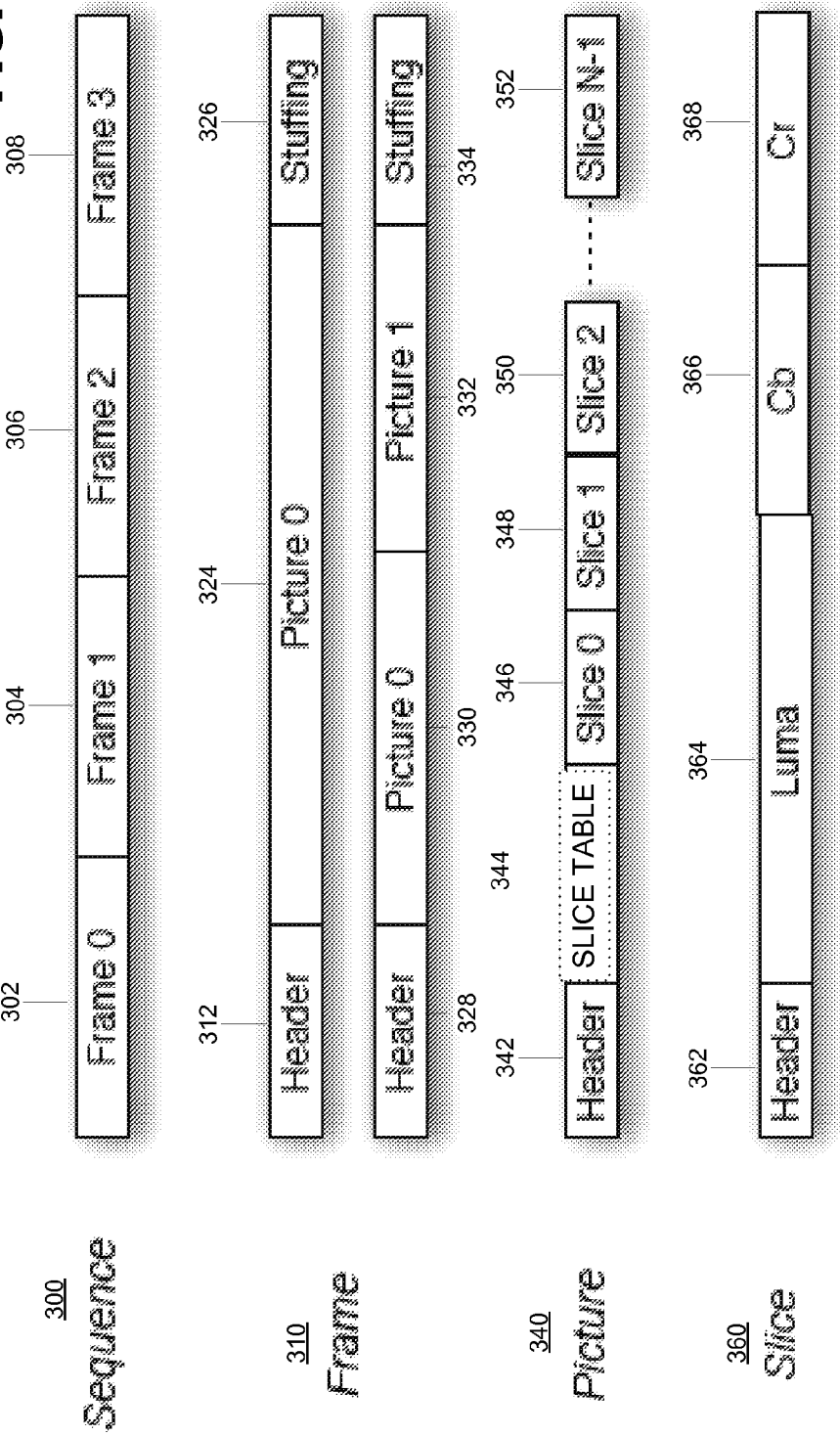

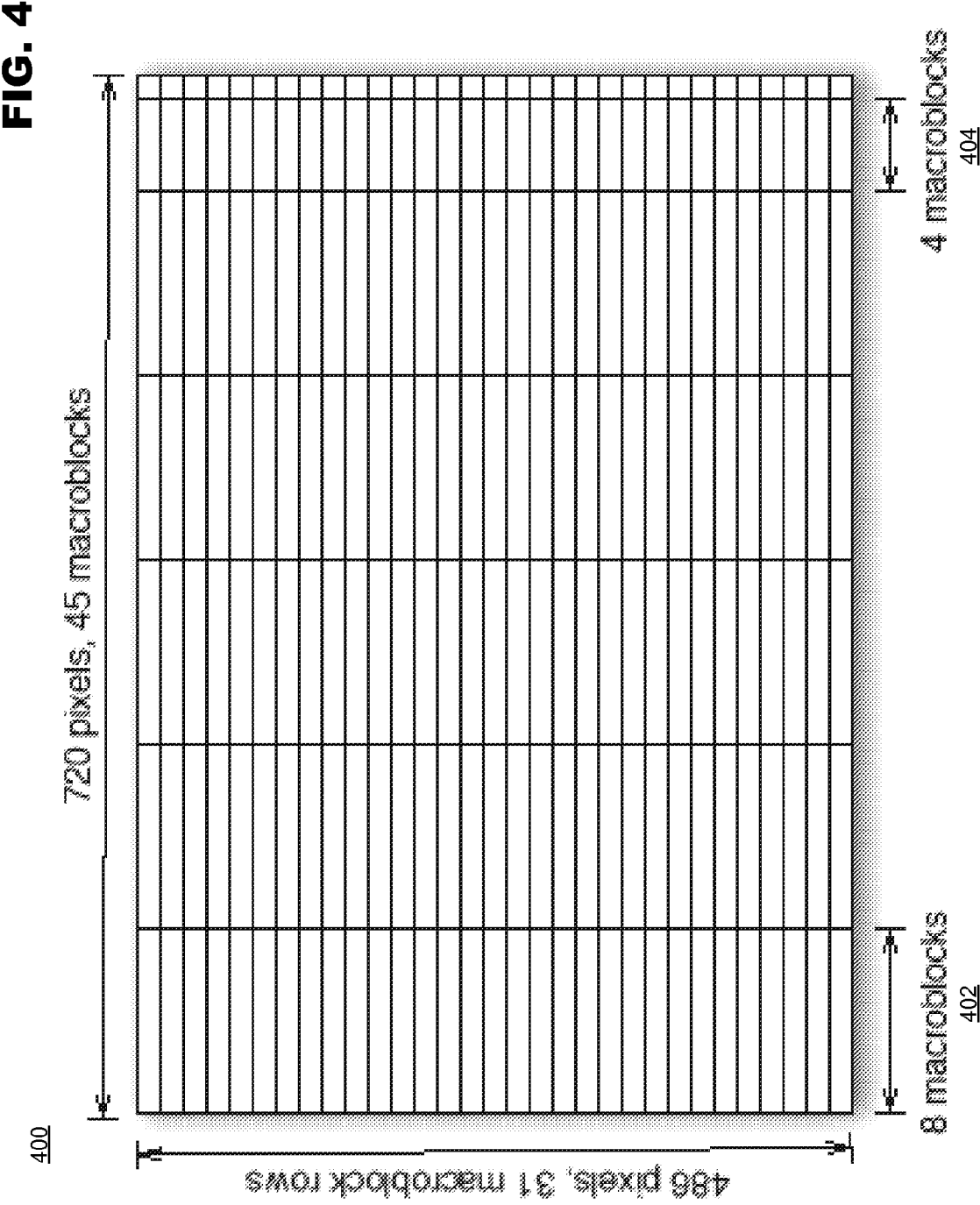

METHOD AND SYSTEM FOR VIDEO RATE CONTROL

CROSS-REFERENCE TO RELATED APPLICATIONS

This application is a continuation-in-part application of U.S. Application Entitled "Method and System for Rate Control", filed herewith, the entire disclosure of which is hereby incorporated by reference.

BACKGROUND

Video comprises a plurality of sequential pictures displayed one after another. Various techniques exist to convert video into digital form to facilitate transmission, storage, and manipulation. Unfortunately, digital video files in its raw data form are large and cumbersome. Various compression schemes have been developed to reduce the size of encoded pictures.

Each picture of a video may be encoded individually, either independent of other pictures of the video (intra-coding) or dependent on other pictures of the video (predictive coding). In video editing applications, intra-coding is often preferred for fast encoding and decoding. In video delivery applications such as DVD and broadcast, predictive coding is often used for better compression.

Various encoding schemes are known for compressing video. Many such schemes are block transform based (e.g., DCT-based), and operate by organizing each frame of the video into two-dimensional blocks. DCT coefficients for each block are then placed in a one-dimensional array in a defined pattern, typically in a zig-zag order through the block. That is, each block is processed independently of each other block, and the DCT coefficients are grouped block-by-block. The coefficients are then encoded using standard run-length/differential encoding according to a predetermined scan direction. For example, the one-dimensional array of coefficients can be converted to a list of run/level pairs, where "run" is the number of consecutive zero coefficients preceding a nonzero coefficient, and level is the value of the nonzero coefficient immediately following those zero coefficients.

The size of an encoded picture is influenced by its content, and therefore, it is difficult to precisely predict a file size of an encoded picture in advance. Generally, the selection of a quantizer is the single most significant factor affecting the resulting encoded picture size. However, changes to the quantizer do not always provide a predictable corresponding change to the picture's size. Only quantized coefficients quantized to nonzero values with a first smaller quantizer may potentially become smaller (and therefore requiring fewer bits to encode) when quantized with the second larger quantizer. Any coefficient that is quantized to zero with the first quantizer will remain zero when quantized with the second larger quantizer, therefore not affecting the picture size. Furthermore, the number of bits saved by using a second larger quantizer is typically different for different coefficients depending on their values. It also depends on values of nearby coefficients because consecutive zeros are coded as one "run" symbol.

It is often desirable to encode a video picture to a specified size for storage, transmission, and performance (encoding and decoding speed) constraints. One approach to enforce such a size requirement is to process each macroblock in the image sequentially, progressively adjusting the quantizer as the encoder encodes the picture. A typical approach is to calculate the average macroblock size and keep track of the number of bits used so far. Before encoding a macroblock, the encoder checks the number of bits it has used up to this point. If it is using more bits than allocated, it uses a larger quantization step size for the next macroblock. If it is using fewer bits than allocated, it uses a smaller quantization step size for the next macroblock. Unfortunately, this sequential approach is difficult to execute simultaneously across a plurality of processors. In addition, an encoded picture may be encoded with many different quantizers, resulting in undesirable variance in visual quality from one macroblock to another when decoded and displayed. Further, the same quantization step size is unlikely to be used again when the image is decoded and re-encoded during the editing process, resulting in non-trivial multi-generation quality loss.

BRIEF DESCRIPTION OF THE DRAWINGS

FIG. 3 illustrates a bit stream according to an embodiment of the present invention.

FIG. 4 illustrates a picture division scheme according to an embodiment of the present invention.

DETAILED DESCRIPTION

A procedure to encode a picture of a video stream with a limited number of coding passes is provided. On each pass, the picture is coded as a plurality of slices and macroblocks, where image data of the macroblocks are subject to coefficient transforms and to quantization by a quantization parameter. On a first pass, the quantization parameter is established as a first value common to all slices of the picture. If the coded picture size exceeds a predetermined limit, the encoder assigns a quantization step size for each slice for the second pass. Small quantization step sizes are assigned to slices that are easy to encode, namely, slices that require few bits to encode for the same or comparable visual quality. This helps preserve visual quality of smooth image areas. If the second-pass coded picture size still exceeds the predetermined limit, a third pass is reached. During the third pass, tough slices (slices that require more bits to encode for a certain visual quality) are assigned new quantization step sizes, and high frequency coefficients are dropped if necessary so that no coded slice size exceeds its maximum size calculated based on the results of the second pass. This guarantees the coded picture size never exceeds its predetermined limit. If any pass generates coded picture data that satisfies the predetermined limit, the coded picture data is outputted to a channel, and the procedure ends. The coded picture data has a picture size approximately equal to a target size but not exceeding the predetermined limit.

Figure 1:
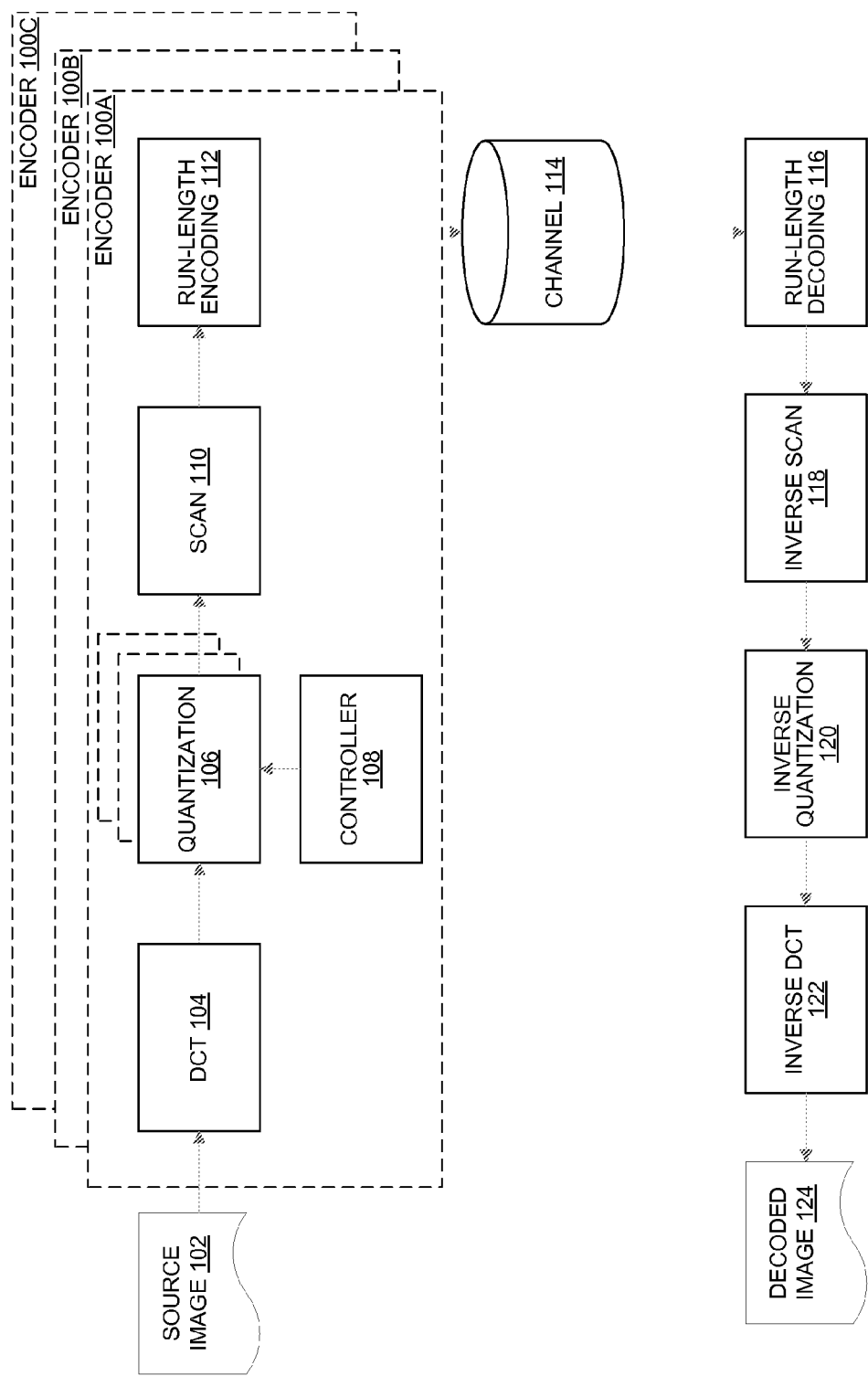
FIG. 1 illustrates an encoder according to an embodiment of the present invention.

FIG. 1 illustrates an encoder according to an embodiment of the present invention. The encoder 100A may be implemented in hardware or software and receives a source image 102, a digital image. For example, the source image 102 may be a picture from a video sequence. It will be understood that the encoder 100A may also receive a video, where each picture making up the video will be encoded.

The source image 102 is first transformed by a discrete cosine transform ("DCT") unit 104. The transform converts spatial variations into frequency variations and produces an array of transform coefficients associated with the source image 102.

A quantization unit 106 then quantizes (e.g., divides) the array of coefficients produced by the DCT unit 104 by a quantization parameter, producing an array of quantized coefficients. A plurality of quantization units may be available within the encoder 100A.

The quantization unit 106 may be controlled by a controller 108. The controller 108 may calculate various values of the quantizer as described and control multiple quantization units 106 within the encoder when encoding in parallel.

A scan unit 110 then scans the two-dimensional array of quantized coefficients and converts it into a one-dimensional array (a string) of coefficient values. Typically, the high frequency corner of the array of quantized coefficients is filled with zeros. By starting in the low frequency corner of the matrix, then zigzagging through the array, the encoder converts the 2-dimensional coefficient array to a 1-dimensional list of coefficient values (a string).

A run-length encoding unit 112 may then scan the string and substitute run-length codes for consecutive zeros in that string. In this process, consecutive zeros are converted to a "run" symbol indicating the number of consecutive zeros, and the array of quantized coefficients is converted to a series of run/level pairs. The run length encoding unit 112 may then apply entropy coding to that result, thus reducing the source image 102 to a much smaller bit stream suitable for transmission or storage. The bit stream may be outputted into channel 114. It will be understood that alternative types of encoding may be used in place of run-length encoding.

The process described above may be reversed in a decoder, where the decoder includes a run-length decoding unit 116, an inverse scan unit 118, an inverse quantization unit 120, and an inverse DCT unit 122. Each unit performs the inverse of its counterpart in the encoder 100A, producing a decoded image 124. The inverse quantization unit cannot perfectly recover coefficients because they have been quantized. Therefore, the compression process is lossy. The decoded image 124 is a close approximation of the source image 102.

A plurality of encoders may be available, such as encoder 100B and 100C. Or a plurality of quantization units may be available in the encoder 100A.

Figure 2:
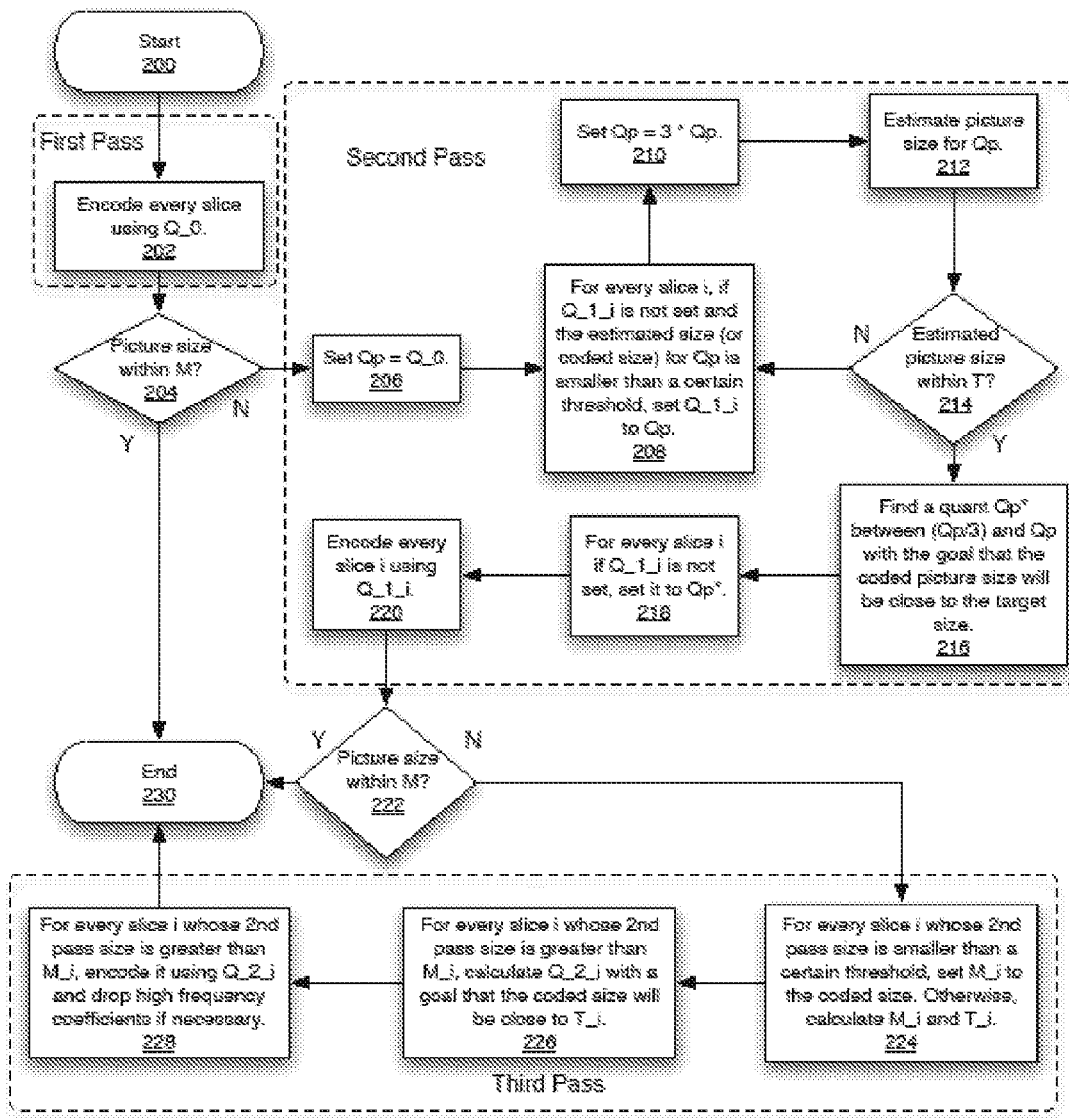
FIG. 2 illustrates a procedure for encoding a picture according to an embodiment of the present invention.

FIG. 2 illustrates a procedure for encoding a picture according to an embodiment of the present invention. The procedure may be executed on an encoder, as depicted in FIG. 1.

In 200, a picture is received and encoding begins.

In 202, a first pass begins. Every slice of the picture is encoded with $Q\_0$, an initial quantizer. The initial quantizer may be a default value, and different default values can be used for different applications. Any value can be used for $Q\_0$, but in general a small value (e.g., 1) is used for high quality encoding and a large value (e.g., 8) is used for standard quality encoding (low bit rate). The encoding may be executed in parallel across multiple processors, each processor encoding one or more slices.

In 204, the encoder may test whether a size of the resulting encoded picture produced in 202 is less than a picture maximum size, M. If yes, the picture has been encoded in one pass and the procedure ends. If no, further compression is necessary and the procedure proceeds to 206.

In 206, a current quantizer value Qp is initialized to $Q\_0$. Qp is increased (in the loop comprising 208, 210, 212, 214) until the estimated picture size is smaller than a target picture size T. $Q\_1\_i$ is the quantization step size to be used in the second pass encoding for slice i, and each $Q\_1\_i$ will be set by the end of 218. As Qp is increased, $Q\_1\_i$ is set (in 208) for slice i if the slice is relatively easy to be encoded, as determined in 208. If $Q\_1\_i$ is not set before 218, it will be set in 218 to a value Qp* determined in 216.

In 208, the procedure tests whether the coded size (when Qp is $Q\_0$) or estimated coded size (when Qp is not $Q\_0$) for slice i at Qp is less than a predetermined threshold. The threshold may be a fraction of the average slice size, and may be different for different Qp. If the coded size or estimated coded size is less than the threshold, $Q\_1\_i$ is set to Qp for second pass encoding. The quantizer selection is then final for slice i for second pass encoding. Every slice is processed independently in 208.

In 210, Qp is increased. For example, Qp may be multiplied by 3. Alternatively, Qp may be incremented or otherwise increased by an amount.

In 212, a coded picture size is estimated. The estimated picture size may be calculated as the sum of all estimated coded slice sizes. For every slice i, if $Q\_1\_i$ has been set, its estimated coded size is calculated for $Q\_1\_i$; if $Q\_1\_i$ has not been set, its estimated coded size is calculated for Qp.

In 214, estimated coded pictures size is compared with a target picture size T. If the estimated picture size is smaller than T, the process proceeds to 216. If not, it proceeds to 208.

In 216, Qp* is calculated for all slices whose second-pass quantizers ($Q\_1\_i$) have not been set. A value Qp* may be calculated as $Qp^* = (Qp/3) * 3^{\wedge}((\text{estimated\_size\_of\_}(Qp/3) - T)/\text{estimated\_size\_of\_}(Qp/3) - \text{estimated\_size\_of\_}(Qp))$.

Note that Qp* is between Qp/3 and Qp. Qp* is calculated so that the second pass coded size will be close to the target size T.

In 218, for every slice i, if $Q\_1\_i$ has not been set, set it to Qp*. After 218 finishes and before 220 begins, $Q\_1\_i$ must have been set for every slice i.

In 220, each slice i is encoded with $Q\_1\_i$. The encoding may be executed in parallel.

In 222, the procedure tests whether the picture encoded in 220 is smaller than M. If yes, the procedure ends after two passes. If no, further compression is necessary and the procedure proceeds to 224 for a third pass.

In 224, the third pass begins. A target size $T\_i$ and a maximum size $M\_i$ is calculated for each slice i that undergoes the third pass. A slice undergoes the third pass if its second-pass coded size exceeds a threshold. The threshold is chosen to balance bit allocation among slices for overall picture quality. It may depend on Qp*, and is usually a fraction of average slice size.

In 226, $Q\_2\_i$ is calculated for slice i that undergoes the third pass such that the estimated coded size for slice i is close to its target size $T\_i$. $Q\_2\_i$ is calculated in a manner similar to that in 208, 210, 212, 214.

In 228, every slice i that undergoes the third pass is encoded with $Q\_2\_i$, as calculated in 226. For each slice i, high frequency coefficients are dropped during encoding if necessary so that the coded size does not exceed its maximum size $M\_i$ calculated in 224. Slices of the picture may be encoded in parallel.

In 208, the slice size is estimated for Qp, which is $Q\_0 * 3^{\wedge}n$, where n is an integer equal to $\log 3(Qp/Q\_0)$. The actual coded size for $Q\_0$ is known from 202. A method to estimate the size of a coded slice when encoded with Qp is outlined as follows.

The slice size is the sum of its header size, bits used for DC coefficients, bits used for runs for AC coefficients, and bits for levels for AC coefficients. These values may be separately estimated and summed for the slice size estimate.

Header size is known from the implementation of the slices, and does not change after quantization. Thus, an exact header size may be calculated.

DC coefficients generally become smaller when Qp increases, except when the coefficients are already zero. The number of bits for DC coefficients can be estimated by subtracting an estimated number of bits from the number of bits used for Q_0. Thus, number_of_bits_at_Qp=number_of_bits_at_Q_0−alpha*number_of_DC_tokens*n, where:

alpha is a constant representing the average number of bits reduced per coefficient when quantization step size is increased 3-fold, alpha varies depending on the actual coding scheme, but in general should be approximately log 2(3) =1.585 bits, and number_of_DC_tokens is the number of DC coefficients that contribute to DC bits reduction when quantizer is increased, for example, the number of DC coefficients that are nonzero what n quantized with Q_0, and n is log 3(Qp/Q_0).

AC levels bits can be calculated as follows:

A histogram of absolute values of quantized coefficients is collected in 202 when encoding with Q_0. The thresholds for the eight bins are:

T[0]=0; T[1]=3*T[0]+1=1; T[2]=3*T[1]+1=4; T[3]=3*T[2]+1=13; T[4]=3*T[3]+1=40; T[5]=3*T[4]+1=151; T[6]=3*T[5]+1=364; T[7]=3*T[6]+1=1093.

Histogram[i] is the number of quantized coefficients (quantized with Q_0) with absolute values greater than T[i] and smaller than or equal to T[i+1].

Any coefficient in bin i for Q_0 moves to bin (i−n) for Q_0*3^n for n<=i and becomes 0 for n>i (assuming no coefficient is greater than 1093*3+1=3280). Thus, the histogram for Q_p=Q_0*3^n can be used to estimate the bits for AC levels. The sum of (histogram[i]*beta[i]) for i=0, 1 . . . 7 is used to estimate AC level bits where beta[i] is the estimated bits per coefficient for coefficients in bin[i]. The values of beta[i] can be derived from a training set prior to encoding; they depend on the particular coding scheme being used. Different number of bins and different thresholds may be used.

AC runs bits can be calculated as follows:

A number of bits for AC runs as encoded by Q_0 is known from 202. The number of runs at Q_0 equals the number of nonzero quantized coefficients, calculated as histogram[0]+histogram[1]+ . . . +histogram[7]. The number of runs at Qp=Q_0*3^n is calculated from the histogram for Qp=Q_0*3^n. Let t be the number of runs at Q_0, and b[t] be the number of run bits for t. When one coefficient becomes 0, b[t−1] can be estimated as:

(1/t)*(b[t]*(t−1)/t)+(1−1/t)*(b[t]*(t−1)/t+gamma)=b[t]*(t−1)/t+gamma*(t−1)/t, assuming (1) the probability that the coefficient becoming 0 is the last one is 1/t; (2) gamma additional bits (usually smaller than 1) are need to encode the bigger run resulting from the concatenation of two runs when the coefficient becoming 0 is not the last one; and (3) the coefficient becoming 0 has the same number of bits as other coefficients before it becomes 0.

Thus, b[t−2]=b[t]*(t−2)/t+gamma*(t−2)*(1/t+1/(t−1)), and b[s]=b[t]*s/t+gamma*s/(1/t+1/(t−1)+ . . . +1/(s+1)) for 0<=s<t.

Gamma may be determined from a training set, and (1/t+1/(t−1)+ . . . +1/(s+1)) may be approximated.

It should be appreciated that alternative methods to estimate encoded slice size may be used.

The procedure also provides an encoding method where the encoding of each picture does not depend on the result of any other picture. Thus, multiple frames may be processed simultaneously in parallel by multiple processors. This also improves the probability that the same quantizer is used for multiple generations of encoding/decoding because the quantizer choice depends only on the picture itself and does not depend on adjacent pictures. Multi-generational quality loss occurs when an encoded video is decoded, and the decoded video is re-encoded. If a different quantization step size is used every time a picture is decoded and re-encoded, the picture quality will degrade quickly.

The chance that the same quantizer is used for successive generations of decoding/encoding is further improved by assigning small quantizers to easy slices in 208. The same quantizer will be used for easy slices regardless of other slices, which means that the quality in smooth areas will be preserved even if other parts of the picture undergo some changes during the editing process. This reduces potential quality degradation caused by post-production manipulation of the pictures.

FIG. 3 illustrates a bit stream according to an embodiment of the present invention. A video may be a sequence of images 300 including a plurality of frames 302, 304, 306, and 308. It is understood that while only four frames are depicted in sequence 300, any number of frames may be included in a sequence.

A frame 310 may include a header 312, picture field 324, and possibly stuffing data 326. The header 312 may include header information, such as a size of the picture, frame dimension, frame rate information, and metadata relating to the picture field 324. The picture field 324 may be an encoded video picture, for example, as encoded by the procedure described later. The stuffing 326 may be filler bits provided as needed to guarantee the frame 310 is a specified size, for example, for storage or transmission reasons. The frame 310 may include one picture field 324 if the frame is intended for a progressive scan.

In an alternative embodiment, the frame 310 may include a header 328, a first picture field 330, a second picture field 332, and stuffing 334. The header 328 may be similar to the header described above. Each of the picture fields 330 and 332 may be similar to the picture field described above. The stuffing 334 may be similar to the stuffing described above. Frame 310 may store a plurality of picture fields. It is understood that while only two picture fields are depicted, any number of picture fields may be included within a frame. The frame 300 may include two picture fields 330 and 332 if the frame is intended for an interlaced scan.

A picture 340 may include a header 342, which may include header information, such as metadata relating to the picture 340 or as described above. The picture 340 may include a slice table 344 of slice sizes, which may be used to index all slices stored in the picture 340. The picture 340 may include slices 346, 348, 350 and 352. The slice table 344 may be optional. It is understood that while only four slices are depicted, any number of slices may be included within a picture. Each slice may be as described below.

A slice 360 may include a header 362, which may include header information, such as metadata relating to the slice 360 or as described above. The slice 360 may include a field for luminance content 364, for blue chrominance content 366, and for red chrominance content 368. Together, the three components may describe a slice of a picture in digital form. The slice 360 may further be divided into macroblocks, where each macroblock is a 16×16 array of pixels to be displayed, and display property data associated with the pixels. Each macroblock may include a number of blocks or pixel blocks.

FIG. 4 illustrates a picture division scheme according to an embodiment of the present invention. For example, a picture 400 may be 720 pixels horizontally and 486 lines vertically.

Each pixel may be associated with display property data (luminance, blue chrominance, and red chrominance).

The picture is further divided into macroblocks, with each macroblock including an array of 16×16 pixels. Any number of macroblocks may be combined into a slice. For example, a plurality of eight macroblocks 42 may be combined into a first slice. Similarly, a plurality of four macroblocks 404 may be combined into a second slice. As described in FIG. 3, a slice may contain display property data of its associated pixels, where the pixels are organized by macroblock. Optionally, macroblock data may be organized into sub-macroblock partitions (e.g., 8×8 blocks) for coding.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

We claim:

1. A method of coding a picture within a video stream with a limited number of coding passes, comprising:
on each pass, coding at least one slice associated with the picture, image data of the slice being subject to coefficient transform and to quantization by a quantization parameter, wherein
on a first pass, quantizing all slices with a first value of the quantization parameter that is common to all slices of the picture,
on a second pass, which is reached when a size of coded picture data obtained from the first pass exceeds a predetermined limit, encoding a first set of selected slices with a second value of the quantization parameter,
on a third pass, which is reached when a size of coded picture data obtained from the second pass exceeds the predetermined limit, encoding a second set of selected slices with a third value of the quantization parameter,
for coded data of the slice that exceeds a predetermined slice limit after the third pass, canceling coefficients of display components when a size of the display component reaches a predetermined or calculated size, and
outputting the coded picture data to a channel.

2. The method of claim 1, wherein
the first value of the quantization parameter is smaller than the second value of the quantization parameter, and
the second value of the quantization parameter is smaller than the third value of the quantization parameter.

3. The method of claim 1, wherein the second and third values of the quantization parameter are selected to provide a coded slice data size approximately equal to a pre-determined slice size.

4. The method of claim 1, wherein
the first set of selected slices include slices associated with a first pass encoded slice size exceeding a predetermined slice size.

5. The method of claim 1, wherein at least two of the slices in the first, second, or third passes are encoded in parallel.

6. The method of claim 1, wherein the first value of the quantization parameter is a default value.

7. A method for encoding a picture, comprising:
on a first pass, encoding all slices of the picture into a first encoded picture using a first universal quantization parameter value;
on a second pass, when the size of the first encoded picture is greater than a maximum picture size, encoding a first subset of slices with a second quantization parameter value and producing a second encoded picture from the encoded first subset and a subset of slices encoded with the first universal quantization parameter value;
on a third pass, when the size of the second encoded picture is greater than the maximum picture size, encoding a second subset of slices with a third quantization parameter value;
for an encoded slice encoded with the third quantization parameter value that has a slice size that is greater than a maximum slice size, dropping coefficients of display components when a size of the display component reaches a predetermined or calculated size, and
outputting the coded picture data to a channel;
wherein during encoding, image data of each slice is subject to coefficient transform and to quantization by a quantization parameter value.

8. The method of claim 7, wherein the dropped coefficients are a set of high-frequency coefficients of the slice of the picture.

9. The method of claim 7, wherein the method requires no more than three passes over the picture.

10. The method of claim 7, further comprising:
encoding a first slice of the picture on a first processor; and
encoding a second slice of the picture on a second processor substantially concurrently with the encoding of the first slice.

11. The method of claim 7, wherein the first universal quantization parameter value is set to a default value.

12. A system for encoding a picture, comprising:
a memory, the memory storing a first universal quantizer and a maximum picture size;
a quantization unit, the quantization unit configured to quantize an array of transform coefficients into an array of quantized coefficients wherein during encoding, image data of a slice is subject to coefficient transform and to quantization by a quantization parameter value; and
a controller in communication with the memory and the quantization unit, the controller configured to,
on a first pass, encode all slices of the picture into a first encoded picture using a first universal quantization parameter value,
on a second pass, when the size of the first encoded picture is greater than a maximum picture size, calculate a second quantization parameter value, and encoding a first subset of slices with the second slice quantization parameter value to produce a second encoded picture from the encoded first subset and a subset of slices encoded with the first universal quantization parameter value, and
on a third pass, when the size of the second encoded picture is greater than the maximum picture size, calculate a third quantization parameter value, and encode a second subset of slices with the third quantization parameter value, for an encoded slice encoded with the third quantization parameter value that has a slice size that is greater than a maximum slice size, dropping coefficients of display components when a size of the display component reaches a predetermined or calculated size, wherein the coded picture data is output to a channel.

13. The system of claim 12, wherein the dropped coefficients are a set of high-frequency coefficients of the slice of the picture.

14. The system of claim 12, further comprising:
a discrete cosine transform unit, the discrete cosine transform unit configured to provide an array of transform coefficients representing a picture to the quantization unit.

15. The system of claim 12, further comprising:
a scanning unit, the scanning unit configured to convert an array of quantized coefficients produced by the quantization unit into a string.

16. The system of claim 12, further comprising:
a second controller, wherein a second picture is encoded by the second controller and the first picture is encoded substantially concurrently.

* * * * *